(12) United States Patent
Ohwe

(10) Patent No.: US 7,379,270 B2
(45) Date of Patent: May 27, 2008

(54) HEAD SUPPORTING MECHANISM

(75) Inventor: Takeshi Ohwe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 11/060,313

(22) Filed: Feb. 18, 2005

(65) Prior Publication Data

US 2005/0135014 A1    Jun. 23, 2005

Related U.S. Application Data

(63) Continuation of application No. PCT/JP03/00489, filed on Jan. 21, 2003.

(51) Int. Cl.
*G11B 5/48* (2006.01)
(52) U.S. Cl. .................... 360/245; 360/245.3
(58) Field of Classification Search ........... 360/245, 360/245.3, 245.4
See application file for complete search history.

(56) References Cited

U.S. PATENT DOCUMENTS

| | | | |
|---|---|---|---|
| 5,027,241 A * | 6/1991 | Hatch et al. ............. | 360/255 |
| 5,208,712 A * | 5/1993 | Hatch et al. ............. | 360/254.8 |
| 5,237,475 A * | 8/1993 | Kazama et al. ......... | 369/13.17 |
| 5,282,103 A * | 1/1994 | Hatch et al. ............. | 360/245 |
| 6,088,201 A * | 7/2000 | Kazama .................. | 360/244.2 |
| 6,172,853 B1 * | 1/2001 | Davis et al. ............. | 360/245.7 |
| 6,307,716 B1 | 10/2001 | Hamaguchi et al. .... | 360/254.4 |
| 2002/0060888 A1 | 5/2002 | Kanda | |
| 2003/0193751 A1 * | 10/2003 | Ohwe et al. ............. | 360/245.1 |
| 2005/0007703 A1 * | 1/2005 | Okamoto et al. ........ | 360/245 |

FOREIGN PATENT DOCUMENTS

| | | |
|---|---|---|
| JP | 62-279570 | 12/1987 |
| JP | 1-245477 | 9/1989 |
| JP | 1-177473 | 12/1989 |
| JP | 3-95783 | 4/1991 |
| JP | 7-296536 | 11/1995 |
| JP | 8-263946 | 10/1996 |
| JP | 9-198824 | 7/1997 |
| JP | 10-116409 | 5/1998 |
| WO | WO 00/75922 A1 | 12/2000 |

* cited by examiner

*Primary Examiner*—Brian E. Miller
(74) *Attorney, Agent, or Firm*—Kratz, Quintos & Hanson, LLP

(57) ABSTRACT

A head supporting mechanism including a loading beam, a flexure and a head slider. The loading beam has a proximal portion, a distal portion and an intermediate portion defined between the proximal portion and the distal portion while at least partially overlapping with the head slider. A width of the intermediate portion is smaller than those of the head slider and the flexure. Accordingly, the flexure is exposed on opposite sides of the intermediate portion of the loading beam. When the head slider is attached to the flexure after the flexure has been mounted to the loading beam, a jig is disposed while bridging the intermediate portion of the loading beam to press the exposed part of the flexure. The distal portion and the intermediate portion have the same width and the same cross-sectional shape.

9 Claims, 4 Drawing Sheets

HEAD SUPPORTING MECHANISM

CROSS-REFERENCE TO RELATED APPLICATION

This application is a continuation application and is based upon PCT/JP03/00489, filed on Jan. 21, 2003.

BACKGROUND OF THE INVENTION

1. Field of the Invention

The present invention relates to a head supporting mechanism for supporting a magnetic head for writing information to a disk device or reading the same therefrom.

2. Description of the Related Art

The magnetic disk device includes a plurality of magnetic disks and a magnetic head for having access to the magnetic disk. The magnetic head is provided on a head slider, and the head slider is supported by a suspension. The head supporting mechanism includes a loading beam constituting the suspension, a flexure attached to the loading beam and the head slider attached to the flexure. The flexure has a wiring pattern, and a terminal of a head element is connected to the wiring pattern of the flexure.

A suspension of a CSS (contact start stop) type magnetic disk device is disclosed, for example, in Japanese Unexamined Patent Publication (Kokai) No. 1-245477. The suspension disclosed in this publication has a groove on a back surface of a head slider for fixing a loading beam and a flexure on a bottom of the groove formed on the back surface of the head slider.

A magnet disk device having a loading and unloading suspension is disclosed, for example, in Japanese Unexamined Patent Publication (Kokai) Nos. 8-263946 and 11-250603. In the case of the loading and unloading suspension, a loading beam extends longer than a head slider to form a so-called lift tab at a distal end thereof. When the magnet disk is stopping, the lift tab engages with a ramp disposed in the vicinity of the magnetic disk so as to hold the head slider away from the magnetic disk.

When a head supporting mechanism is manufactured, the flexure is first attached to the loading beam and then the head slider is fixed to the flexure. To fix the head slider to the flexure, it is necessary to press the head slider and the flexure to each other. For this purpose, jigs for fixing the head slider are used. One jig supports the head slider from the underside thereof, and the other presses the flexure from the upside thereof.

In the case of the loading and unloading suspension, however, because a distal portion of the loading beam extends over the head slider, the flexure and the head slider are covered with the loading beam. When the head slider is fixed to the flexure, it is impossible to bring the jig into contact with the flexure because the flexure has already been mounted to the loading beams which will disturb such an operation. Accordingly, in the prior art, the loading beam is provided with a window through which the jig is inserted to be in contact with the flexure so that the head slider is fixed to the flexure.

FIG. 12 is a plan view illustrating the head supporting mechanism of the conventional loading and unloading suspension. A lift tab 142 is provided at a distal end of a loading beam 128. A flexure 130 is disposed beneath the loading beam 128, and a head slider (not shown) is disposed beneath the flexure 130. The head slider is mounted onto a slider fixing section 134 of the flexure 130. The loading beam 128 has two windows 150 so that the slider fixing section 134 of the flexure 130 is exposed from the windows 150. The jig is inserted into the windows 150 to press the flexure 130. Thus, it is possible to fix the head slider to the flexure 130.

If the windows are provided in the loading beam, however, it is necessary to increase a width of a portion in the loading beam in which the head slider is positioned. Thereby, a mass of the portion in the loading beam in which the head slider is positioned increases to cause a problem in that the resonance frequency of the suspension lowers to deteriorate the positioning accuracy of the head.

SUMMARY OF THE INVENTION

An object of the present invention is to provide a head supporting mechanism capable of fixing a head slider to a flexure without increasing a mass of a portion in a loading beam of a loading and unloading suspension in which the head slider is positioned.

The inventive head supporting mechanism comprises a loading beam, a flexure attached to the loading beam and a head slider attached to the flexure wherein the loading beam has a proximal portion, a distal portion located on the outside of the head slider and an intermediate portion defined between the proximal portion and the distal portion while at least partially overlapping with the head slider, characterized in that a width of the intermediate portion is smaller than those of the head slider and the flexure.

According to the present invention, because the width of the intermediate portion of the loading beam (a portion in which the head slider is located) can be smaller even in the loading/unloading suspension, it is possible to reduce a mass of the intermediate portion of the loading beam, whereby the resonance frequency is not lowered and there is no adverse effect on the positional accuracy of the head.

Preferably, the flexure has a section for mounting the head slider, and the width of the flexure is slightly larger than that of the head slider.

Preferably, the flexure is exposed on opposite sides of the intermediate portion of the load beam, so that a jig for attaching the head slider to the flexure can be disposed to bridge the intermediate portion of the loading beam.

Preferably, the intermediate portion of the loading beam extends between a position closer to the proximal portion rather than a center of the head slider and a position corresponding to an end of the head slider closer to the distal portion. In such a case, the intermediate portion of the loading beam extends between a position outside of the end of the head slider closer to the proximal portion and a position corresponding to the end of the head slider closer to the distal portion. That is, a width of the proximal portion of the loading beam is tapered toward the distal end, and when a width of the intermediate portion of the loading beam is constant, a joint between the proximal portion and the intermediate portion is located outside of the end of head slider closer to the proximal portion of the head slider.

Preferably, a cross-section of the intermediate portion in the loading beam is approximately a C-shape. Preferably, a cross-section of the distal portion in the loading beam is approximately a C-shape.

Preferably, a cross-sectional shape of the intermediate portion in the loading beam is equal to that of the distal portion. In such a case, a cross-sections of the intermediate portion and the distal portion in the loading beam are preferably approximately a C-shape.

Preferably, a dimple for loading the head slider is formed in the intermediate portion of the loading beam. Also, a lifting dimple is formed in the distal portion of the loading beam.

DETAILED DESCRIPTION OF THE PREFERRED EMBODIMENTS

Figure 5:
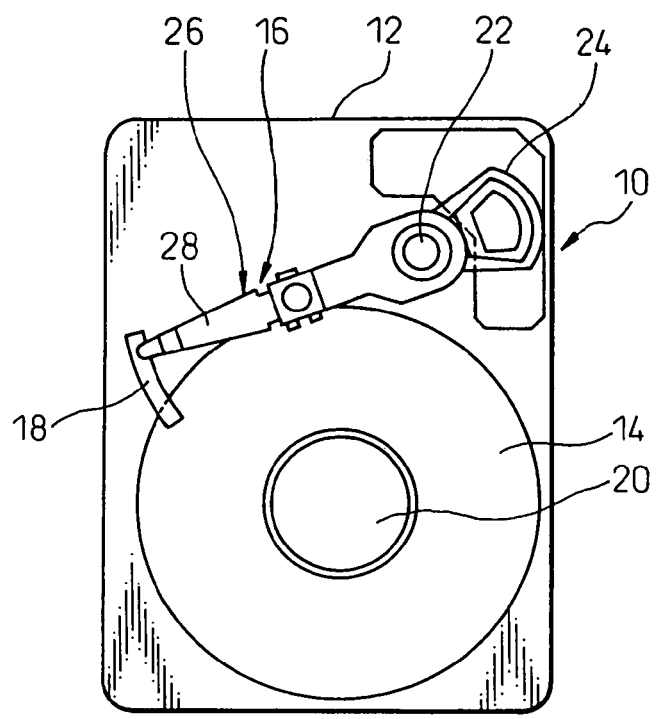
FIG. 5 is a diagrammatic plan view of a magnetic disk device having a loading and unloading suspension.

First, a magnetic disk device having a loading and unloading suspension will be briefly described with reference to FIG. 5. The magnetic disk device 10 includes an enclosure 12, a plurality of magnetic disks 14, a suspension 16, and a ramp 18 disposed in the vicinity of the magnetic disks 14. The magnetic disks 14 are made to rotate by a spindle motor 20. The suspension 16 is attached to a shaft 22 in a rotatable manner and made to rotate by a voice coil motor 24. A lift tab formed at a distal end of the suspension 16 is engageable with the ramp 18, so that the lift tab runs on the ramp when the magnetic disk 14 is stopping to hold the head slider away from the magnetic disk.

The suspension 16 is contained in a head supporting mechanism 26 as a part thereof, and the head supporting mechanism 26 includes a loading beam 28, a flexure described later and the head slider. As is known, a magnetic head is provided in the head slider.

Figure 1:
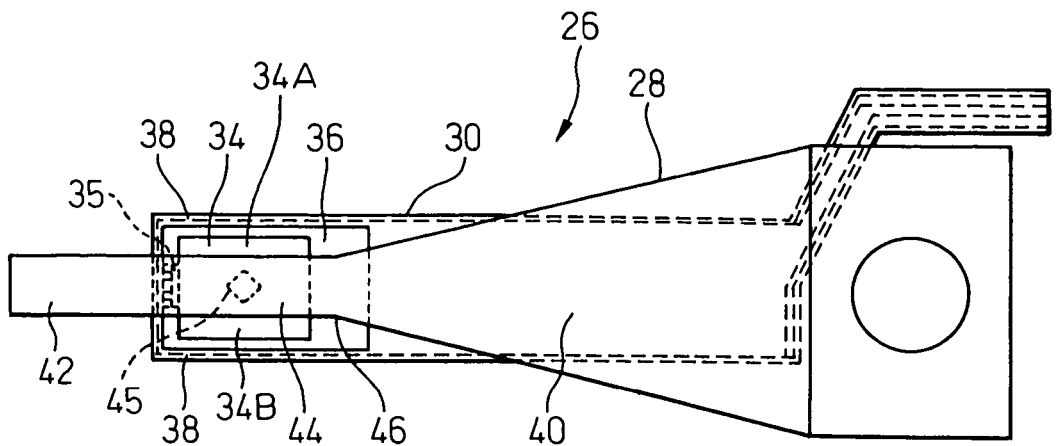
FIG. 1 is a plan view of a head supporting mechanism according to one embodiment of the present invention.
Figure 2:
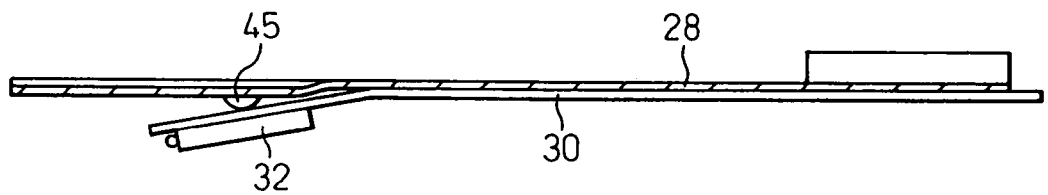
FIG. 2 is a sectional view of the head supporting mechanism shown in FIG. 1.
Figure 3:
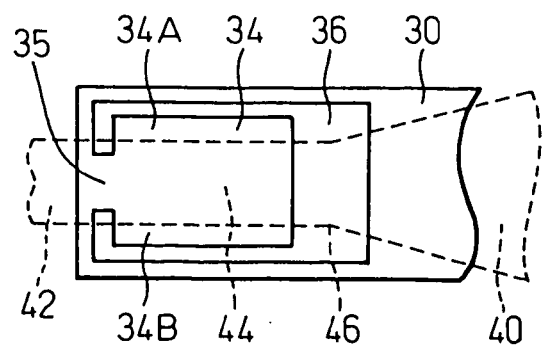
FIG. 3 is an enlarged plan view illustrating part of a flexure in the head supporting mechanism shown in FIG. 1.
Figure 4:
FIG. 4 is an enlarged sectional view of a distal portion of a loading beam shown in FIG. 1.

FIG. 1 is a plan view illustrating the head supporting mechanism 26 according to one embodiment of the present invention. FIG. 2 is a sectional view illustrating the head supporting mechanism 26 shown in FIG. 1. FIG. 3 is an enlarged plan view illustrating a part of a flexure 30 shown in 1. FIG. 4 is an enlarged sectional view illustrating a distal portion of the loading beam 28.

The head supporting mechanism 26 includes the loading beam 28, the flexure 30 attached to the load beam 28, and a head slider 32 attached to the flexure 30. The flexure 30 has a gimbal 34 as a mounting section for the head slider 32, and the gimbal 34 is encircled by a groove 36 and coupled to a main body of the flexure 30 by a bridge 35. A size of the head slider 32 is approximately equal to a size of the gimbal 34, and accordingly, a width of the flexure 30 is larger than a width of the head slider 32.

The flexure 30 has a circuit pattern 38 formed along the periphery of the flexure 30 and extending to the gimbal 34 via the bridge 35. When the head slider 32 is mounted to the gimbal 34, a circuit terminal of the magnetic head in the head slider 32 is connected to an end of the circuit pattern 38. The other end of the circuit pattern 38 is connected a flexible printed circuit board (not shown).

The loading beam 28 has a proximal portion 40 located on a root side, a distal portion 42 located outside the head slider 32, and an intermediate portion 44 disposed between the proximal portion 40 and the distal portion 42 while at least partially overlapping with the head slider 32. The distal portion 42 is referred to as a lift tab and engaged with the ramp 18 shown in FIG. 5. Further, a dimple 45 for loading the head slider is formed in the intermediate portion 44 of the loading beam 28.

The proximal portion 40 of the loading beam 28 is formed to be a flat plate tapered in width toward the distal end thereof. The distal portion 42 and the intermediate portion 44 have a constant width. As shown in FIG. 4, the distal portion 42 has a generally C-shaped cross-section. A cross-sectional shape of the intermediate portion 44 is equal to that of the distal portion 42. Accordingly, in this embodiment, the distal portion 42 and the intermediate portion 44 continuously have a constant width and are formed to have a generally C-shaped cross-section. The loading beam 28 is formed, for example, by a contraction machining.

A joint (or a boundary point) 46 between the proximal portion 40 and the intermediate portion 44 is located at a position outer than an end of the head slider 32 closer to the proximal portion 40. In FIG. 1, the joint is located within the groove 36. Accordingly, the intermediate portion 44 of the head slider 32 extends between the position outer than the end of the head slider 32 closer to the proximal portion 40 and the position corresponding to an end of the head slider 32 closer to the distal portion 42.

In this regard, according to the present invention, the position of the joint 46 is not limited to that shown in FIG. 1, but may be within the head slider 32. In such a case, the position of the joint 46 is preferably closer to the proximal portion 40 rather than a center of the head slider 32. That is, the intermediate portion 44 of the loading beam 28 extends between a position in the head slider closer to the proximal portion rather than a center thereof and a position corresponding to an end of the head slider 32 closer to the distal portion of the head slider 32.

A width of the intermediate portion 44 of the loading beam 28 is smaller than those of the head slider 32 and a portion of the flexure 30 corresponding thereto. Accordingly, The gimbal 34 is exposed on both sides of the intermediate portion 44 of the loading beam 28. The exposed portions are denoted by 34A and 34B.

When the head supporting mechanism 26 is manufactured, flexure 30 is first attached to the loading beam 28, and then the head slider 32 is fixed to the flexure 30. To fix the head slider 32 to the flexure 30, it is necessary to press the head slider 32 and the flexure 30 to each other. For this purpose, jigs for fixing the head slider are used. One of the jigs supports the head slider 32 from underside thereof, and the other presses the flexure 30 from the upside thereof.

Even if the flexure 30 has been attached to the loading beam 28, it is possible to press the jigs, for attaching the head slider 32 to the flexure 30, onto the exposed portions 34A and 34B of the flexure 30, and to fix the head slider 32 to the flexure 30. Alternatively, a single jig having a bifurcate presser may be used. In such a case, the jig is disposed while bridging the intermediate portion 44 of the loading beam 28, whereby the exposed portions 34A and 34B can be simultaneously pressed.

As described above, according to the present invention, because a width of the intermediate portion 44 (in which the head slider 32 is located) of the loading beam 28 can be smaller even in a case of the loading and unloading suspension, it is possible to reduce a mass of the intermediate portion 44 of the loading beam 28 whereby the resonance frequency is not lowered and there is no adverse effect on the positioning accuracy of the head.

Figure 6:
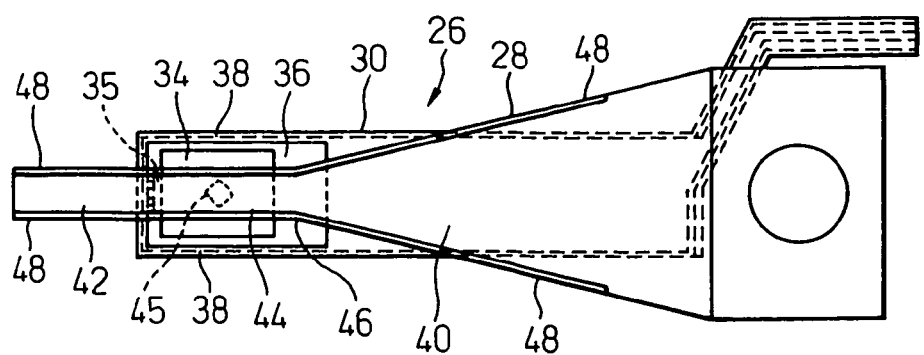
FIG. 6 is a plan view illustrating a head supporting mechanism according to another embodiment of the present invention.
Figure 7:
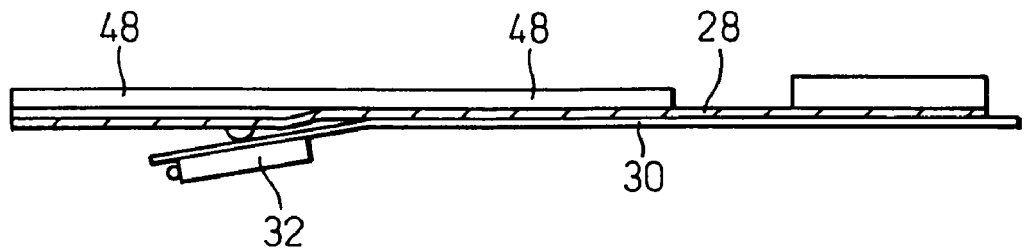
FIG. 7 is a sectional view of the head supporting mechanism shown in FIG. 6.
Figure 8:
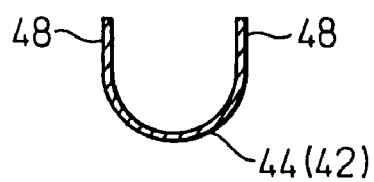
FIG. 8 is an enlarged sectional view of a distal portion of a loading beam shown in FIG. 6.

FIG. 6 is a plan view illustrating a head supporting mechanism according to another embodiment of the present invention. FIG. 7 is a sectional view of the head supporting mechanism shown in FIG. 6. FIG. 8 is an enlarged sectional view illustrating a distal portion 42 of a loading beam 28 shown in FIG. 6. This embodiment is the same as the above-mentioned embodiment in FIGS. 1 to 4 except that bending ribs 48 are formed on lateral edges of the loading beam 28. As described with reference to FIGS. 1 to 4, because an intermediate portion 44 of the loading beam 28 becomes narrow and therefore a narrow portion of the loading beam 28 is longer, the rigidity of the loading beam 28 is liable to decrease. To improve the rigidity of the loading beam 28, the bending ribs 48 are formed on the lateral edges of the loading beam 28. The bending ribs 48 are formed not only in the distal portion 42 and the intermediate portion 44 of the loading beam 28 but also in the proximal portion 40. In this regard, the bending ribs 48 may be provided solely in the distal portion 42 and the intermediate portion 44 of the loading beam 28. The drawing technique is applied to the formation of the ribs.

The head supporting mechanism in this embodiment has the rib provided on the respective side of the proximal portion, the intermediate portion and the distal portion of the loading beam such that it is a continuous rib arranged in a plurality of straight lines and curves or arranged in a plurality of straight lines.

Figure 9:
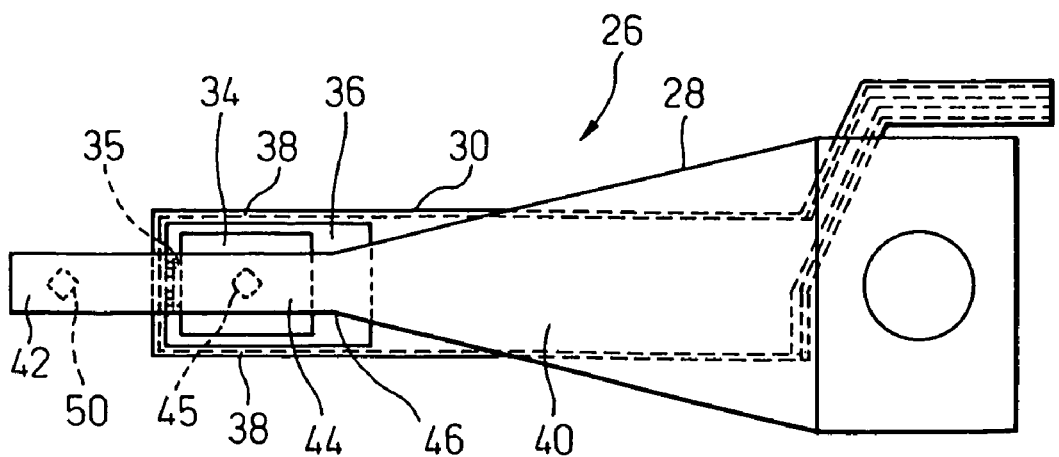
FIG. 9 is a plan view illustrating a head supporting mechanism according to a further embodiment of the present invention.
Figure 10:
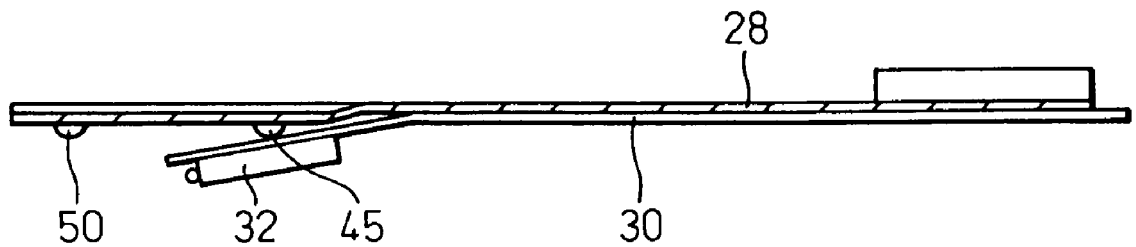
FIG. 10 is a sectional view of the head supporting mechanism shown in FIG. 9.
Figure 11:
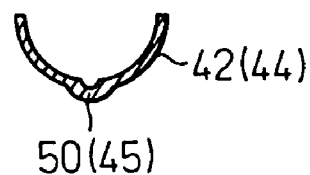
FIG. 11 is an enlarged sectional view of a distal portion of a loading beam shown in FIG. 9.
Figure 12:
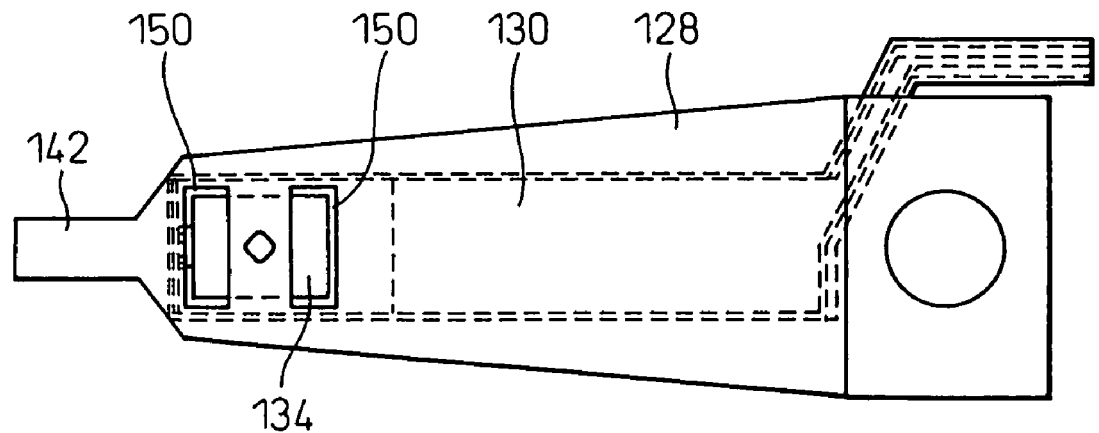
FIG. 12 is a plan view illustrating a conventional head supporting mechanism.

FIG. 9 is a plan view of a head supporting mechanism according to a further embodiment of the present invention. FIG. 10 is a sectional view of the head supporting mechanism shown in FIG. 9. FIG. 11 is an enlarged sectional view of a distal portion 42 of a loading beam 28 shown in FIG. 9. This embodiment is the same as the embodiment shown in FIGS. 1 to 4, except that a lifting dimple 50 is provided in the distal portion 42 of the loading beam 28.

A dimple 45 for loading the head slider is formed in the intermediate portion 44 of the loading beam 28. The lifting dimple 50 and the dimple 45 for loading the head slider may be formed at the same time by a punching. The lifting dimple 50 is of a hemispherical shape smaller in size than the distal portion 42 of the loading beam 28 to be in stable contact with the ramp 18 (see FIG. 5) by a small area. Thus, the stable loading/unloading operation is carried out by the lifting dimple 50.

What is claimed:

1. A head supporting mechanism comprising a loading beam, a flexure attached to said loading beam and a head slider attached to said flexure wherein said loading beam has a proximal portion, a distal portion located on the outside of said head slider and an intermediate portion defined between said proximal portion and said distal portion while overlapping with said head slider, wherein a width of said intermediate portion, in a region at least overlapping with said head slider, is smaller than those of said head slider and said flexure, said proximal portion of the loading beam is formed to be a flat plate and tapered in width toward the distal end thereof, a proximal-side end of the intermediate portion of said loading beam is located at a position closer to said proximal portion, rather than a proximal side end of said head slider, and a distal-side end thereof is located at a position approximately corresponding to a distal-side end of said head slider closer to said distal portion.

2. A head supporting mechanism as defined by claim 1, wherein said flexure has a section for mounting said head slider, and said width of said flexure is larger than that of said head slider.

3. A head supporting mechanism as defined by claim 2, wherein said flexure is exposed on opposite sides of said intermediate portion of the load beam, so that a jig for attaching said head slider to said flexure can be disposed to bridge said intermediate portion of said loading beam.

4. A head supporting mechanism as defined by claim 1, wherein said end of said intermediate portion of said loading beam is located at a position outside of said end of said head slider closer to said proximal portion, and the other end thereof is located at a position approximately corresponding to said end of said head slider closer to said distal portion.

5. A head supporting mechanism as defined by claim 1, wherein a cross-section of said intermediate portion in said loading beam is approximately of a C-shape;
wherein a cross-section of said distal portion in said loading beam is approximately of a C-shape; and
wherein a cross-sectional shape of said intermediate portion in said loading beam is equal to that of said distal portion.

6. A head supporting mechanism as defined by claim 5, wherein cross-sections of said intermediate portion and said distal portion of said loading beam are approximately of a C-shape.

7. A head supporting mechanism as defined by claim 6, wherein a dimple for loading said head slider is formed in said intermediate portion of said loading beam.

8. A head supporting mechanism as defined by claim 7, wherein a lifting dimple is formed in said distal portion of said loading beam.

9. A head supporting mechanism according to claim 1, further comprising:
bending ribs formed on the lateral edges of the loading beam in the proximal, intermediate and distal portions of the loading beam.

* * * * *